United States Patent [19]

Brunie et al.

[11] 3,726,917
[45] Apr. 10, 1973

[54] PROCESS FOR PREPARING ADIPIC ACID

[75] Inventors: Jean Claude Brunie; Michel Costantini; Noël Crenne; Michel Jouffret, all of Rhone, France

[73] Assignee: Rhone-Poulenc S.A., Paris, France

[22] Filed: Oct. 2, 1970

[21] Appl. No.: 77,749

[30] Foreign Application Priority Data

Oct. 6, 1969 France..................................6934016

[52] U.S. Cl.................260/533 C, 260/526, 260/610
[51] Int. Cl...............................................C07c 51/18
[58] Field of Search .......................260/527 R, 533 C

[56] References Cited

UNITED STATES PATENTS 2,452,741  11/1948  Fleming................................260/533

*Primary Examiner*—James A. Patten
*Attorney*—Stevens, Davis, Miller & Mosher

[57] ABSTRACT

Adipic acid is obtained from a cyclohexane oxidation product containing cyclohexyl hydroperoxide and by-products including 6-hydroperoxy-hexanoic acid, obtained by liquid phase oxidation of cyclohexane with a molecular oxygen-containing gas and without a metal catalyst by washing the oxidation product with water, separating the aqueous phase containing 6-hydroperoxy-hexanoic acid and subjecting the 6-hydroperoxy-hexanoic acid to oxidation with molecular oxygen under pressure.

9 Claims, No Drawings

PROCESS FOR PREPARING ADIPIC ACID

The present invention relates to a process for preparing adipic acid from by-products present in the cyclohexyl hydroperoxide solutions obtained by oxidizing cyclohexane in the liquid phase without a metal catalyst, using a molecular oxygen containing gas.

It is well known to oxidize cyclohexane with gaseous mixtures containing molecular oxygen to give solutions in which the types and amount of oxidation products vary considerably depending on the conditions under which the oxidation is carried out.

Thus, in the oxidation of cyclohexane with air in the liquid phase and in the presence of metal catalysts such as cobalt derivatives, cyclohexanol and cyclohexanone are mainly obtained. It is known to remove at least a part of the by-products formed during this oxidation before distillation of the final products by washing with water or alkaline solutions, either at the end of the oxidation or during or between the different stages of the oxidation. In addition to monocarboxylic acids and dicarboxylic acids, these aqueous wash solutions essentially contain ε-hydroxycaproic acid and polymers derived therefrom, and it is known to subject them to oxidation with nitric acid, if appropriate after having removed the dissolved cyclohexanol and cyclohexanone by distillation, and if necessary, after concentration.

Furthermore, it is known that oxidation products of cyclohexane, in which the proportion of cyclohexyl hydroperoxide in the oxidized products is relatively high, can be obtained if certain operating conditions are adhered to. Among the latter, it has been proposed to carry out the oxidation without a catalyst, to keep the reactants for a very short residence time in the oxidizer, and to operate at relatively low temperatures, with low conversion yields and in an apparatus which does not catalyze the decomposition of the hydroperoxides. With this in mind it has also been suggested to carry out the reaction in the presence of sequestering agents for metals or to treat the cyclohexane which is recycled to the oxidation zone with a basic agent.

In spite of these various measures, which undoubtedly help in increasing the proportion of cyclohexyl hydroperoxide in the oxidation products, an amount of by-products, which is still considerable, is nevertheless formed in the course of the oxidation. Among the by-products, only cyclohexanol, cyclohexanone and adipic acid have hitherto aroused interest, since they constitute fundamental starting materials for the chemical industry. However, in view of the increasing importance of the preparation of cyclohexyl hydroperoxide by oxidation of cyclohexane, the utilization of the by-products contained in the oxidation product, other than those mentioned above, also becomes of increasing importance.

The present invention is concerned with producing adipic acid, a useful precursor of polyesters and polyamides, from oxidation by-products present in cyclohexyl hydroperoxide solutions obtained by liquid phase oxidation of cyclohexane, without a metal catalyst, using a gas containing molecular oxygen. The cyclohexyl hydroferoxide solutions of cyclohexane so treated contain less oxidation by-products and are better adapted for certain applications.

Accordingly, the present invention provides a process for preparing adipic acid from a cyclohexane oxidation product containing cyclohexyl hydroperoxide and by-products including 6-hydroperoxy-hexanoic acid, obtained by liquid phase oxidation of cyclohexane with a molecular oxygen containing gas and without a metal catalyst which comprises washing the oxidation product with water, separating the aqueous phase containing 6-hydroperoxy-hexanoic acid and subjecting the 6-hydroperoxy-hexanoic acid to oxidation with molecular oxygen under pressure.

Any cyclohexane oxidation product containing cyclohexyl hydroperoxide, and prepared by liquid phase oxidation with a molecular oxygen containing gas without a metal catalyst, can be treated according to the present process, but the benefit derived from this treatment becomes more important the higher the proportion of hydroperoxides in the oxidized products. The process is particularly useful for treating cyclohexyl hydroperoxide solutions of cyclohexane in which the oxidized products less volatile than cyclohexane contain at least 50 percent by weight of the peroxide products. Such solutions can be prepared by the process described in French Pat. specification No. 1,505,363 or by the first step of the process described in U.S. Pat. No. 2,931,834. These solutions may be concentrated before washing by applying any known technique.

The washing with water is carried out in the liquid phase at temperatures between 5° and 100° C, optionally under autogenic pressure or a pressure exerted by an inert gas such as nitrogen, if the temperature employed is greater than the boiling point of the water-cyclohexane azeotrope. The weight of water used is generally from 0.01 to 1 times, preferably from 0.05 to 0.5 times, the weight of the solution to be washed. Any of the customary techniques of washing in the liquid phase can be used, and the operation can be carried out continuously or discontinuously.

Before being subjected to the oxidation with molecular oxygen, the 6-hydroperoxyhexanoic acid can be purified. This purification can be effected, for example, by extraction of the aqueous wash solutions with an alcohol, ester or ketone immiscible with water. The alcohols which can be used include alkanols having four to 10 carbon atoms, cycloalkanols having five to eight carbon atoms in the ring, optionally substituted by one or more alkyl groups having one to four carbon atoms, and phenylalkanols having seven to 10 carbon atoms. Ketones which can be used include dialkylketones having four to 12 carbon atoms, cycloalkanones having five to eight carbon atoms in the ring, optionally substituted by alkyl groups having one to four carbon atoms, and phenylalkylketones and cycloalkylalkylketones having eight to 10 carbon atoms. Esters which can be used include those derived from alkylcarboxylic acids having two to eight carbon atoms and alkanols having one to four carbon atoms.

Specific organic solvents which can be used as extraction agents are ethyl acetate, amyl acetate, butyl propionate, methyl 2-ethylhexanoate, amyl alcohols, 2-ethylhexanol, 3-methyl-2-pentanol, methylcyclo-hexanols, methyl ethyl ketone, methyl isobutyl ketone, cyclohexanone, acetophenone and methylpropylketone. The extraction can be carried out between 10° and 30° C, and weights of extraction agent which are 0.5 to 5 times the weight of the aqueous solution to be extracted can be used.

The purification can be performed by removing the extraction agent, preferably under reduced pressure and at a temperature below 50° C. This operation can be carried out in several stages, eliminating between successive stages, for example by filtration, the diacids which precipitate from the concentrated solution, if necessary after cooling. The residue can be subjected to a supplementary purification if appropriate, by dissolving it in water, forming the sodium salt of 6-hydroperoxyhexanoic acid, for example by addition of sodium bicarbonate, washing the aqueous solution with an ether or a liquid hydrocarbon such as cyclohexane, and then, after acidification, extracting the 6-hydroperoxyhexanoic acid with one of the extraction agents specified above.

According to a preferred embodiment of the process according to the invention, an aqueous solution of 6-hydroperoxyhexanoic acid is subjected to oxidation. The concentration of the acid can vary within wide limits without affecting the oxidation, but generally is between 5 percent and 25 percent by weight. This aqueous solution can be obtained by dissolving purified 6-hydroperoxyhexanoic acid in water. It is also possible to subject to oxidation the aqueous washing solutions containing 6-hydroperoxy-hexanoic acid obtained in the washing step. Before the aqueous solution is subjected to oxidation, the small quantities of cyclohexyl hydroperoxide, cyclohexanol and cyclohexanone contained in it can be extracted with a liquid hydrocarbon such as cyclohexane. They can also previously be concentrated, preferably under reduced pressure and at a temperature not exceeding 50° C, and where appropriate, the diacids which precipitate are then separated, if necessary after cooling.

The oxidation of the 6-hydroperoxyhexanoic acid can be effected by heating 50° and 150° C, preferably between 70° and 120° C. The oxidation is conveniently effected with molecular oxygen diluted with an inert gas, or by a mixture of inert gases, and air is advantageously used.

In accordance with a practical embodiment of carrying out the process, an aqueous solution of 6-hydroperoxy-hexanoic acid is introduced into an autoclave, followed by air under a pressure which can range from 10 to 120 bars, preferably between 20 and 80 bars. The autoclave is thereafter maintained at the temperature chosen, and is then maintained under these conditions until the absorption of oxygen has ceased.

The adipic acid can be separated from the residual mixture in accordance with conventional procedures, for example by successive crystallizations.

The following examples are given to illustrate the invention. Temperatures are in °C.

EXAMPLE 1 a. A solution of cyclohexane hydroperoxides, obtained by oxidizing cyclohexane in the liquid phase without a catalyst, is introduced continuously at the rate of 21 kg/hr with air of reduced oxygen content, into the base of a plate column having an external jacket in which a fluid kept at 82° circulates, and the pressure is then released until atmospheric pressure is reached. Water is simultaneously added in counter-current, at the rate of 1 kg/hour. The pressure in the column is kept at 2 bars relative. The pressure on the aqueous washing phase is released and the phase is separated at the base of the column. It contains 10.3 percent by weight of 6-hydroperoxyhexanoic acid.

b. 350 g of sodium bicarbonate are added to 3,500 g of the aqueous solution, and the solution obtained is then extracted 5 times using 500 cm³ of diethyl ether each time. 420 cm³ of 10N hydrochloric acid are then added to the aqueous phase, and the solution obtained is then extracted 4 times using 600 cm³ of ethyl acetate each time. All the organic phases are dried over sodium sulphate and are then subjected to a concentration by heating at 20° under a pressure of 100 mm of mercury. After cooling, the adipic acid which has precipitated is filtered off and 230 g of an oil containing 43 percent by weight of 6-hydroperoxyhexanoic acid and 2.8 percent by weight of adipic acid remains.

c. an aqueous solution prepared from 23.25 g of this oil and 76 g of water is introduced into a 500 cm³ shaken autoclave, followed by air under a pressure of 60 bars. The contents are then heated at 105° for 1 hour 30 minutes. The maximum pressure observed at this temperature is 84 bars. After cooling and release of gas, the residual mixture is concentrated and then cooled to about 10°; adipic acid precipitates and 8.2 g of crystals containing 5.9 g of adipic acid are isolated by filtration.

The adipic acid remaining in solution in the mother liquors is determined by vapor phase chromatography of its methyl ester, and in this way it is found that the mother liquors still contain 1.5 g of adipic acid.

The solution of cyclohexane hydroperoxides used was prepared according to the process described in French Pat. specification No. 1,491,518. It contains 8 percent by weight of oxidation products and 5.8 percent by weight of hydroperoxides.

EXAMPLE 2

100 g of the aqueous solution obtained as described in Example 1 a are washed twice, using 40 cm³ of cyclohexane each time. The aqueous phase is retained and introduced into a 500 cm³ volume autoclave, and is then treated as described in Example 1 c. After cooling and release of gas, the residual mixture is found to contain 7.1 g of adipic acid.

EXAMPLE 3

6 kg of aqueous washing solution obtained according to the method described in Example 1 a are introduced into a 30 l autoclave provided with a rotating stirrer; this solution contains 11 percent by weight of 6-hydroperoxy-hexanoic acid and 3.5 percent by weight of adipic acid. Air is then introduced under a pressure of 30 bars and the autoclave is heated at 132° for 2 hours; the maximum pressure observed at this temperature is 43 bars.

After cooling to 60° C and release of gas, the residual mixture is drawn off and then cooled to −2°. After filtration, the precipitate is washed with iced water and then dried at 50° C under 15 mm Hg pressure. 445 g of crystals containing 87 percent by weight of adipic acid are thus obtained.

From a determination on the dimethyl ester, it is found that the filtrate still contains 127 g of adipic acid.

We claim:

1. A process for preparing adipic acid from a cyclohexane oxidation product containing cyclohexyl hydroperoxide and by-products including 6-hydroperoxy-hexanoic acid, obtained by liquid phase oxidation of cyclohexane with a molecular oxygen-containing gas and without a metal catalyst which comprises washing the oxidation product with water, separating the aqueous phase containing 6-hydroperoxy-hexanoic acid and subjecting the 6-hydroperoxy-hexanoic acid to oxidation with molecular oxygen under pressure.

2. A process according to claim 1 wherein the 6-hydroperoxy-hexanoic acid is recovered from the aqueous phase and dissolved in water to give an aqueous solution which is subjected to oxidation.

3. A process according to claim 2 in which the aqueous phase is extracted with a water immiscible solvent comprising an alcohol, ester or ketone and the extracted 6-hydroperoxy-hexanoic acid subjected to oxidation.

4. A process according to claim 1 wherein the aqueous phase containing 6-hydroperoxy-hexanoic acid is subjected to oxidation.

5. A process according to claim 4 wherein, prior to oxidation, the aqueous phase is extracted with a liquid hydrocarbon.

6. A process according to claim 1 wherein the oxidation product is a solution of cyclohexyl hydroperoxide in cyclohexane in which the oxidized products less volatile than cyclohexane contain at least 50 percent by weight of peroxy compounds.

7. A process according to claim 1 wherein the oxidation product is washed at 5°–100° C. with an amount of water which is 0.01 to 1.0 times the weight of oxidation product.

8. A process according to claim 1 wherein the 6-hydroperoxy-hexanoic acid is oxidized at 50°–150° C. with air.

9. A process according to claim 2 wherein the oxidation product is a solution of cyclohexyl hydroperoxide in cyclohexane in which the oxidized products less volatile than cyclohexane contain at least 50 percent by weight peroxy compounds, the oxidation product is washed with water in countercurrent at about 82° C. using an oxidation product: water weight ratio of about 21:1, the 6-hydroperoxy-hexanoic acid contained in the wash water is extracted with a water immiscible ester which is removed to leave a residue of 6-hydroperoxy-hexanoic acid, the 6-hydroferoxy-hexanoic acid dissolved in water and the resulting solution subjected to oxidation with air at about 105° C. at a pressure rising to about 84 bars.

* * * * *